United States Patent
George et al.

(10) Patent No.: US 6,803,743 B2
(45) Date of Patent: Oct. 12, 2004

(54) JUMP START AND REVERSE BATTERY PROTECTION CIRCUIT

(75) Inventors: Terry A. George, Salem, OH (US); John V Caputo, Canfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/264,932

(22) Filed: Oct. 4, 2002

(65) Prior Publication Data

US 2004/0066168 A1 Apr. 8, 2004

(51) Int. Cl.$^7$ .................................................. H02J 7/00
(52) U.S. Cl. ..................................................... 320/105
(58) Field of Search ................................ 320/104, 105, 320/118, 121, 135, 134, 136; 361/18, 84, 85, 93.8, 93.9, 103, 104; 307/9.1, 10.1, 10.7, 10.8, 127, 130; 323/276, 281

(56) References Cited

U.S. PATENT DOCUMENTS

| | | | | |
|---|---|---|---|---|
| 4,042,836 A | * | 8/1977 | Compton et al. | 327/376 |
| 4,607,209 A | | 8/1986 | Guim et al. | 320/105 |
| 4,871,957 A | | 10/1989 | Taranto et al. | 320/105 |
| 4,958,084 A | | 9/1990 | Carlo et al. | 307/10.2 |
| 5,111,130 A | | 5/1992 | Bates | 320/105 |
| 5,371,455 A | | 12/1994 | Chen | 320/165 |
| 5,493,270 A | * | 2/1996 | Kondo | 340/438 |
| 5,635,817 A | | 6/1997 | Shiska | 320/105 |
| 5,936,317 A | * | 8/1999 | Sasanouchi et al. | 307/10.1 |
| 5,939,865 A | * | 8/1999 | McGrath et al. | 320/156 |
| 5,965,954 A | | 10/1999 | Johnson et al. | 307/10.2 |
| 5,977,654 A | | 11/1999 | Johnson et al. | |
| 6,211,577 B1 | | 4/2001 | Alksnat et al. | 320/135 |
| 6,212,054 B1 | | 4/2001 | Chan | 307/10.7 |
| 6,239,515 B1 | | 5/2001 | Mackel et al. | 307/10.7 |
| 6,281,600 B1 | | 8/2001 | Hough et al. | 307/10.7 |
| 6,548,989 B2 | * | 4/2003 | Duff, Jr. | 320/166 |
| 6,597,150 B1 | * | 7/2003 | Bertness et al. | 320/104 |
| 6,606,227 B2 | | 8/2003 | Rapsinski et al. | 361/66 |

FOREIGN PATENT DOCUMENTS

JP         2003070173      *   3/2003

* cited by examiner

*Primary Examiner*—Pia Tibbits
(74) *Attorney, Agent, or Firm*—David P. Wood

(57) ABSTRACT

A jump start protection circuit having a normally open switch and a resistor positioned in parallel intermediate to a battery and a jump start post. A controller manipulates the switch between an open position and closed position, the closed position connects the jump start post to the battery and the open position disconnects the jump start post from the battery. The controller measures voltages at the battery and jump start post and is capable of receiving one or more additional inputs. The controller closes the switch when acceptable jump start conditions are detected. The controller can open the switch or maintain the switch in an open position. The jump start circuit provides protection against attempts to charge a battery with incorrect polarity connections and attempts to charge a battery from a potentially hazardous higher voltage power source.

18 Claims, 4 Drawing Sheets

JUMP START AND REVERSE BATTERY PROTECTION CIRCUIT

TECHNICAL FIELD

The present invention relates to a circuit protection apparatus that prevents a circuit from being closed when attempting to charge a battery with incorrect polarity connections or attempting to charge a battery from a potentially hazardous higher voltage power source. The apparatus is particularly useful as a motor vehicle jump start protection system and as a short circuit protection system.

BACKGROUND OF THE INVENTION

When a battery of a first motor vehicle is flat (no power), it is known to connect a battery from a second vehicle source across the flat battery in order to start the engine of the first vehicle. Such a technique is commonly referred to as jump starting. It is also known that a flat battery may be recharged by connecting a power source such as a battery charger across the flat battery.

When the battery of a motor vehicle is difficult to access or is not located in the engine compartment, but elsewhere in the vehicle, it has become common practice to provide jump start terminals in the engine compartment which can be connected to either a battery of a second vehicle or a battery charger should the battery of the first vehicle go flat. If the second battery or the battery charger is incorrectly connected (that is, the wrong polarity) to the jump start terminals, electrical components in the first vehicle (especially diodes associated with the generator of the first vehicle) may be damaged. Other conditions which cause the jump start terminal to short circuit to ground can also cause damage.

Weber, U.S. Pat. No. 5,230,637, describes what can happen when sparking or a damaged battery are present when jump starting a vehicle.

As the need for energy in motor vehicles increases with the addition of more electrically powered components and systems, vehicle manufacturers are contemplating higher voltage electrical architectures. The introduction of higher voltage systems increases the probability that someone will try to jump start or recharge a conventional 12 volt battery from a source that has a higher voltage. This situation can damage the battery or electrical components in the vehicle. Use of higher voltages also increases other risks resulting from sparking.

The prior art includes inventions that address the problem of reverse polarity connections when jump starting a battery. Weber '637 provides for jumper cables with reverse polarity protection. Another example of a jump start protection system is described in Alksnat, et al., U.S. Pat. No. 6,211, 577. Alksnat '577 utilizes a jump start circuit, a switch, a logic circuit, and a timer circuit. The '577 patent monitors polarity differences across the jump start terminals and closes the jump start circuit switch if polarities match. A timer circuit is used to open the switch after a predetermined period of time. A manual push button is provided to enable the operator to manually close the jump start circuit switch when a second vehicle is used for jump starting.

In the prior art, in order to provide jump start or reverse polarity connection protection it is necessary that either special jump start cables are used or additional operator actions are performed over and above the traditional jump start method.

SUMMARY OF THE INVENTION

The present invention overcomes the problems noted above and satisfies the need in this field for a device that can provide protection during jump starting without the need for additional operator actions or special jump start cables.

A preferred embodiment of the present invention operates by monitoring voltages at a jump start post and the positive terminal of a DC power source such as a battery. When a jump start is correctly initiated on a flat battery of a first vehicle using an appropriate battery charger or good battery from a second vehicle and correct polarity connections, a microprocessor in the jump start circuit on the first vehicle determines that the values of the two voltages fall within an allowable range of values. The microprocessor then commands that a normally open switch positioned in a circuit between the jump start post and the positive terminal of the battery be closed.

The microprocessor commands the switch to open based on one or more of many possible conditions, such as receiving input from another vehicle module, detection of a condition indicating the jump start connection has been disengaged, detection of a condition precedent to jump start connection disengagement, detection of reverse polarity connections, detection of a short circuit condition or other possible conditions.

When a jump start is incorrectly attempted (e.g., due to reverse polarity connections, connection to a higher voltage power source or inadvertent connection of the positive and negative terminals of the same battery (short circuit)), the switch remains open because the measured voltages fall outside an allowable range of values. Similarly, if a short circuit or other condition causes one or more functions to fall outside an allowable range of values during the course of a jump start the microprocessor commands the switch to open.

In accordance with the present invention a jump start circuit is provided for electrical connection between a positive battery terminal and a jump start post. The jump start circuit includes a switch configured to be coupled between the positive battery terminal and the jump start post. In a preferred embodiment, the switch is biased to a normally open position. The switch has a closed state and an open state, where the switch operates to connect the positive battery terminal to the jump start post when in the closed state and the switch also operates to disconnect the positive battery terminal from the jump start post when in an open state. The jump start circuit further includes a resistor coupled between the positive battery terminal and the jump start post in parallel with the switch. In addition, the jump start circuit also includes a microprocessor that measures voltage at the positive battery terminal and the jump start post, processes the voltage measurements, and commands the switch to close when predetermined conditions are satisfied. The microprocessor commands the switch to open when other predetermined conditions are satisfied.

An advantage of the present invention is that it provides protection against incorrect polarity connection during vehicle jump starting and battery charging.

It is yet another advantage of the present invention to provide protection against jump starting with an inappropriate higher voltage battery.

Yet still another advantage of the present invention is that it enables jump starting with no requirements for additional operator actions over and above the traditional jump start method.

Another advantage of the present invention is that it provides protection if the battery positive potential is short circuited to ground during vehicle jump starting and battery charging.

Still another advantage of the present invention is that it provides short circuit protection for a circuit that connects a power source to a load by preventing a switch from closing the circuit when a short circuit condition exists in the circuit between the switch and the load.

A feature of the present invention is that it can be utilized to provide a cold jump start connection and disconnection, thereby eliminating sparking while connecting and disconnecting jumper cables.

BRIEF DESCRIPTION OF THE DRAWINGS

The present invention will now be described, by way of example, with reference to the accompanying drawings, in which.

DETAILED DESCRIPTION OF THE INVENTION

The jump start and reverse battery protection circuit of the present invention protects against hazards associated with jump starting a motor vehicle. This is accomplished by providing a normally open switch positioned in the line that connects a jump start post to the positive terminal of a DC power source such as a battery. The switch is controlled by an algorithm stored in a microcontroller that measures, among other things, battery voltage and voltage at the jump start post.

Figure 1:
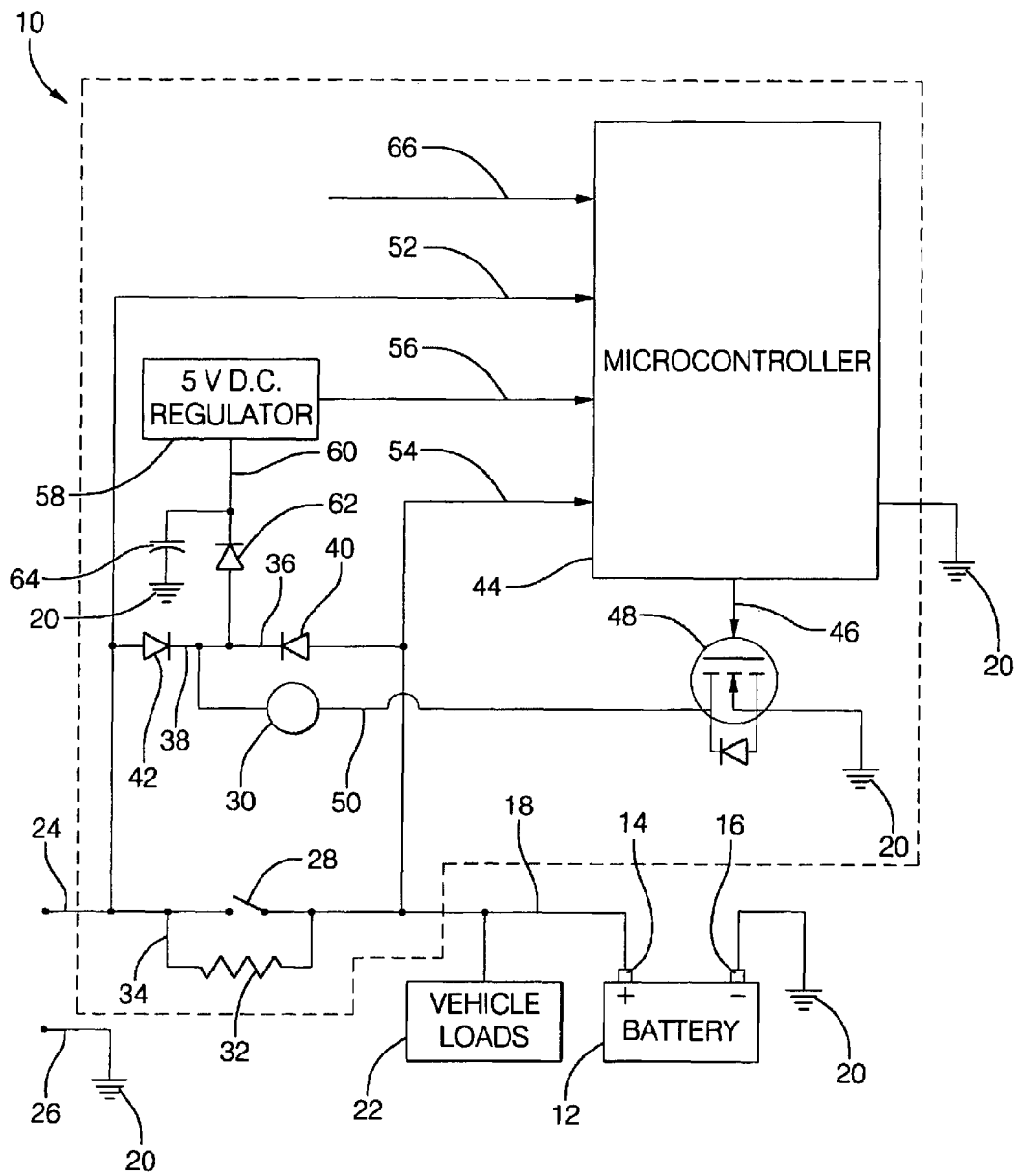
FIG. 1 is a circuit diagram of the present invention.

FIG. 1 illustrates a preferred embodiment of the jump start and reverse battery protection circuit (jump start circuit) 10 of the present invention. A DC power source such as a battery 12, having a positive terminal 14 and a ground terminal 16, normally supplies a voltage between a first line 18 and an electrical ground 20. The battery 12 provides power to vehicle loads 22 such as lights, generator, radio, air conditioning, and ventilation systems.

A first (or positive) jump start post 24 is electrically connected to the first line 18 and a second (or negative) jump start post 26 is electrically connected to the electrical ground 20, to provide jump start posts for the battery 12 should the battery 12 go flat (lose power). Note, a negative jump start post 26 is not required for the present invention to function. A jumper cable can be connected to ground via another approach.

The jump start circuit 10 in accordance with the present invention is electrically connected between the battery 12 and the positive jump start post 24. The jump start circuit 10 includes a switch 28 positioned in the first line 18 between the positive jump start post 24 and the battery 12. The switch 28 may be any kind of switch including an electromechanical device that is actuated by a coil 30 or an electronic switch. In the preferred embodiment, the switch 28 is biased to a normally open position. Alternatively, the switch 28 may be a latching electromechanical switch, a solid state switch, or another switch known to a person of skill in the art.

The jump start circuit 10 also includes a resistor 32 that is electrically connected between the battery 12 and the first jump start post 24. The resistor 32 is positioned in a second line 34 such that the resistor 32 is electrically in parallel with the switch 28. The resistor 32 is sized to enable a voltage to be supplied to the positive jump start post 24, while providing enough resistance to enable only a small or minimal amount of current to flow through it when a circuit path is provided.

The battery 12 provides power to the coil 30 via a third line 36. A fourth line 38 electrically connects the positive jump start post 24 to the coil 30. A first or battery backflow preventing diode 40 is placed in third line 36 and oriented with the anode coupled toward the battery 12 such that current can flow from the battery 12 to the coil 30, but current cannot flow from the positive jump start post 24 to the battery 12. A second or positive jump start post backflow preventing diode 42 is placed in the fourth line 38 and oriented with the anode coupled toward the positive jump start post 24 such that current can flow from the positive jump start post 24 to the coil 30, but current cannot flow from the battery 12 to the positive jump start post 24. As a result of the above described electrical connections, voltage is normally provided to the coil 30 from the battery 12. When the battery 12 is incapable of providing sufficient voltage, voltage provided to the positive jump start post 24 is used to supply voltage to the coil 30.

The jump start circuit 10 includes a microprocessor 44 that has capability to monitor voltage levels at the positive jump start post 24 and positive battery terminal 14, capability to process the voltage measurements, capability to command the switch 28 to close when a first predetermined condition is satisfied, and capability to command the switch 28 to open when a second predetermined condition is satisfied. In addition, the microprocessor 44 may have the capability to receive and process one or more additional inputs. These capabilities are achieved as described below.

The microprocessor 44 has an output 46 that is coupled to a Metal Oxide Semiconductor Field Effect Transistor (MOSFET) switch driver 48. The MOSFET switch driver 48 being configured to open and close the switch 28. It accomplishes this by controlling current flow through the coil 30 via a fifth line 50 that connects the coil 30 to the MOSFET switch driver 48. The MOSFET switch driver 48 is connected to ground 20. The microprocessor 44 commands the switch 28 to close by driving an output to an asserted state that turns on the MOSFET switch driver 48 which energizes the switch's control coil 30 creating sufficient force within the switch 28 to overcome a spring force that holds it open, allowing the switch 28 to close. The microprocessor 44 commands the switch 28 to open by commanding the switch control output to a non-asserted state. This turns off the MOSFET driver 48 causing an interruption in the current flowing to the coil 30. This current interruption causes the switch 28 to open by mechanical spring force.

The microprocessor 44 has a jump start post voltage sense analog to digital (A/D) input 52 that is coupled to the positive jump start post 24 to monitor the voltage level at the positive jump start post 24.

The microprocessor 44 has a battery voltage sense analog to digital (A/D) input 54 that is coupled to the positive battery terminal 14 to monitor the voltage level at the positive battery terminal 14. Each of the voltage sense analog to digital inputs 52,54 converts an analog voltage to a digital value for processing by the microprocessor.

The microprocessor 44 has a 5 volt DC input 56 that is coupled to a 5 volt DC voltage regulator 58. The voltage regulator 58 receives voltage via a sixth line 60. Voltage is supplied to the sixth line 60 from the battery 12 via the first diode 40 and the third line 36. Voltage is also supplied to the sixth line 60 from the positive jump start post 24 via the second diode 42 and the fourth line 38. The sixth line 60 includes a third diode 62. The sixth line 60 between the third diode 62 and the voltage regulator 58 is connected to round 20 via a capacitor 64. The third diode 62 is oriented with the anode coward the battery 12 and positive jump start post 24 such that current can flow from the battery 12 and positive jump start post 24 to the voltage regulator 58 and capacitor 64, but current cannot flow from the voltage regulator 58 or capacitor 64 to the battery 12, positive jump start post 24, or coil 30. The voltage regulator 58, capacitor 64, and third diode 62 are arranged to provide a stable power supply to the microprocessor 44. Voltage is provided to the voltage regulator 58 and capacitor 64 from the battery 12 and positive jump start post 24. The arrangement of the first, second, and third diodes, 40, 42, 62 prevents the coil 30 from using energy stored in the capacitor 64 that is designated for use by the microprocessor 44.

The microprocessor 44 is capable of receiving at least one additional input via a vehicle input 66. This input can include one or more signals from another vehicle module commanding the switch 28 to open or close. This input can also include a signal indicating a jumper cable (not shown) being unclamped from the jump start post 24. This input can also include a signal indicating a step being performed preliminary to disconnection of the jump start connection.

The microprocessor 44 provides an output to turn on the MOSFET switch driver 48 commanding the switch 28 to close when a first predetermined condition is detected by the microprocessor 44. If another similar voltage battery of either higher or lower charge state or an appropriate battery charger is connected to the jump start posts 24, 26 with correct polarity, for a predetermined period of time, such as 2 seconds, a first set of predetermined conditions is satisfied, causing switch 28 to close and initiate a jump start. In this case, the voltage at the positive battery terminal 14 does not equal the voltage at the positive jump start post 24, the voltage at the positive jump start post 24 is within a predefined range, and the voltage at the positive jump start post 24 is stable for 2 seconds. Although 2 seconds is a preferred period of time to allow for the voltage to stabilize, the time to allow for stabilization can range from 0 to 15 seconds.

The microprocessor 44 commands the switch 28 to open by commanding the switch control output to a non-asserted state when a second predetermined condition is detected. This turns off the MOSFET switch driver 48, preventing the voltage from the first jump start post 24 from reaching the battery 12 and vehicle loads 22 via the switch 28. It also prevents voltage from the battery 12 from reaching the first jump start post 24 via the switch 28.

There are many conditions that will cause the switch 28 to open. These conditions include the following conditions from the second set of predetermined conditions that cause the switch 28 to open: the voltage at the positive jump start post 24 or the voltage at the positive battery terminal 14 exceeding a predefined range for a predefined period of time such as 50 milliseconds; a signal being received from another vehicle module indicating the vehicle is moving; or there is insufficient voltage to the coil 30 to hold the switch 28 closed.

In addition or in the alternative, one or more of the following may also be included in the second set of predetermined conditions that cause the switch 28 to open: the absolute value of the voltage at the positive battery terminal 14 minus the voltage at the positive jump start post 24 exceeding a threshold amount (indicating unacceptable switch contact resistance or excessive current); a signal being received commanding the switch 28 to open; a signal being received indicating that a step being performed preliminary to disconnection of the jump start connection; a signal being received indicating an automatic transmission selector being placed into reverse or drive gear; or a signal being received indicating a manual transmission being placed into gear. Other conditions may also be added as they occur to one of ordinary skill in the art.

Any suitable electronic circuitry for voltage monitoring and processing may be used in the microprocessor 44. An exemplary microprocessor 44 is the PIC16F73B microcontroller made by Microchip Corporation. Alternatively, the microprocessor 44 in the jump start circuit of the present invention can be replaced by a logic circuit, state machine or discrete logic gates and voltage comparators that incorporate the same logic algorithm to control the switch 28 actuation through any type of switch driver 48 such as a MOSFET or Bipolar driver.

A vehicle equipped with a preferred embodiment as shown in FIG. 1 will accept or provide charging current in a jump start with another vehicle not equipped with this invention or with another vehicle equipped with this invention. A vehicle equipped with this invention can also accept charging current from a battery charger.

Figure 2:
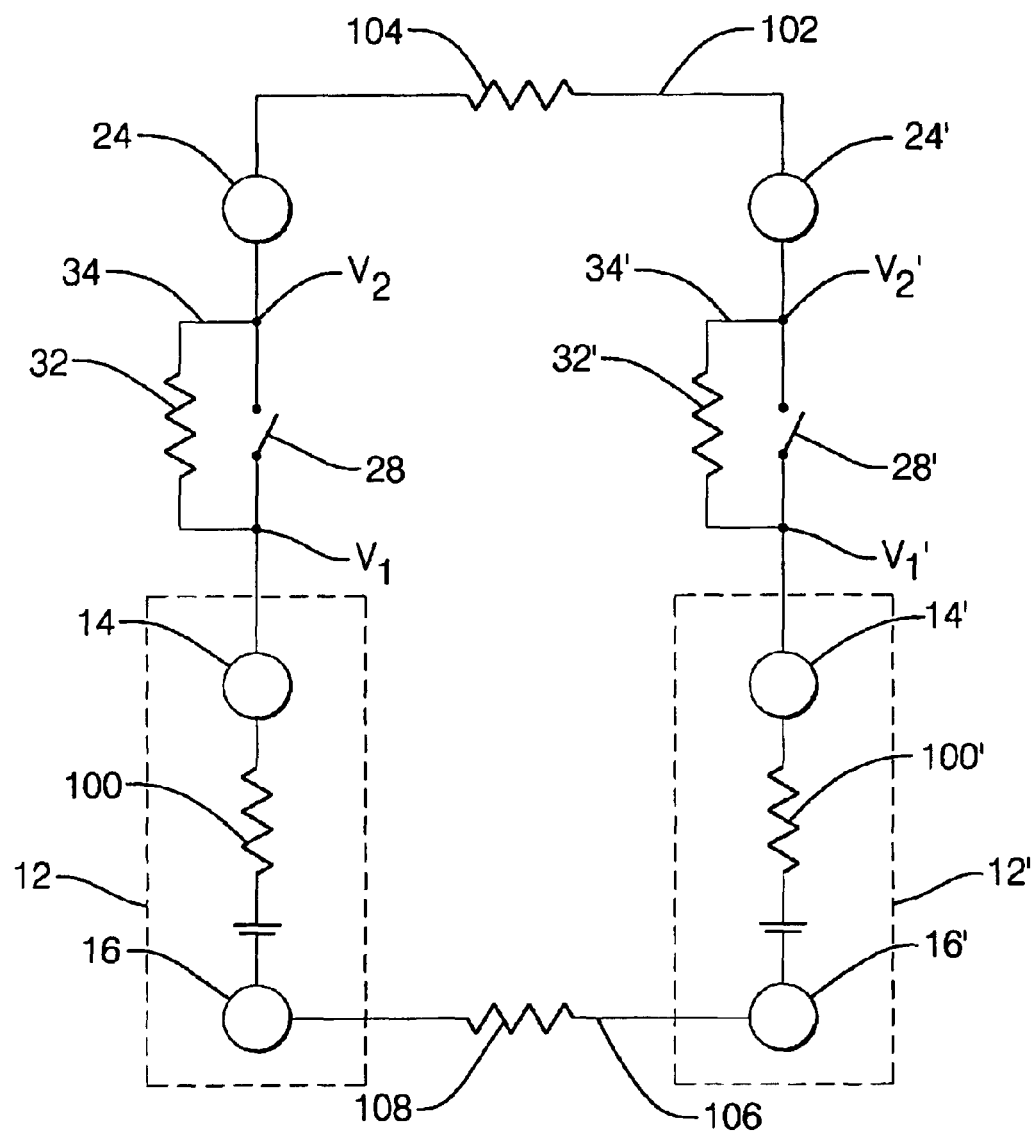
FIG. 2 is a circuit diagram showing use of the present invention in a correctly initiated jump start.

FIG. 2 illustrates one vehicle correctly connected to another vehicle for jump starting, each vehicle having the embodiment of the present invention as depicted in FIG. 1. FIG. 2 depicts a battery 12, positive battery terminal 14, ground battery terminal 16, first (or positive) jump start post 24, switch 28, resistor 32, and second line 34 as described in FIG. 1 on a vehicle 1 with a flat battery. FIG. 2 also depicts a battery 12', positive battery terminal 14', ground battery terminal 16', first (or positive) jump start post 24', switch 28', resistor 32', and second line 34' as described in FIG. 1 on vehicle 2 with a good battery. In addition to the items shown in FIG. 1, FIG. 2 also depicts an internal resistance 100, 100' in each battery 12, 12'. A first jumper cable 102 having an electrical resistance 104 is shown connecting the positive jump start post 24 on vehicle 1 to the positive jump start post 24' on vehicle 2. A second jumper cable 106 having an electrical resistance 108 is shown connecting the ground battery terminal 16 on vehicle 1 to the ground battery terminal 16' on vehicle 2. FIG. 2 depicts the switches 28, 28' as open. The switches 28, 28' would typically be open before the respective microprocessor (not shown) of the present invention on each vehicle determines that predetermined conditions are satisfied for the respective switch 28, 28' on each vehicle to close.

In the example depicted in FIG. 2, the internal battery resistance 100, 100' on each vehicle is small or negligible, the resistance 104, 108 of each jumper cable is small or negligible, and assuming the resistance values of the resistors 32, 32' on each vehicle are approximately equal, then where the voltage $V_1$ at the positive battery terminal 14 on vehicle 1 equals 10 V and the voltage $V_1'$ at the positive battery terminal 14' on vehicle 2 equals 12 V, then the voltage $V_2$ at the positive jump start post 24 on vehicle 1 and the voltage $V_2'$ at the positive jump start post 24' on vehicle 2 would each equal approximately 11V. This voltage falls in a range that would typically partially or fully satisfy the set of predetermined conditions necessary to close the switch 28, 28' on each vehicle. Note that it is not necessary for the resistance values of the resistors 32, 32' to be approximately equal for the present invention to function. Further, there is no need for an additional button to initiate a jump start between two vehicles similarly equipped with this invention.

Figure 3:
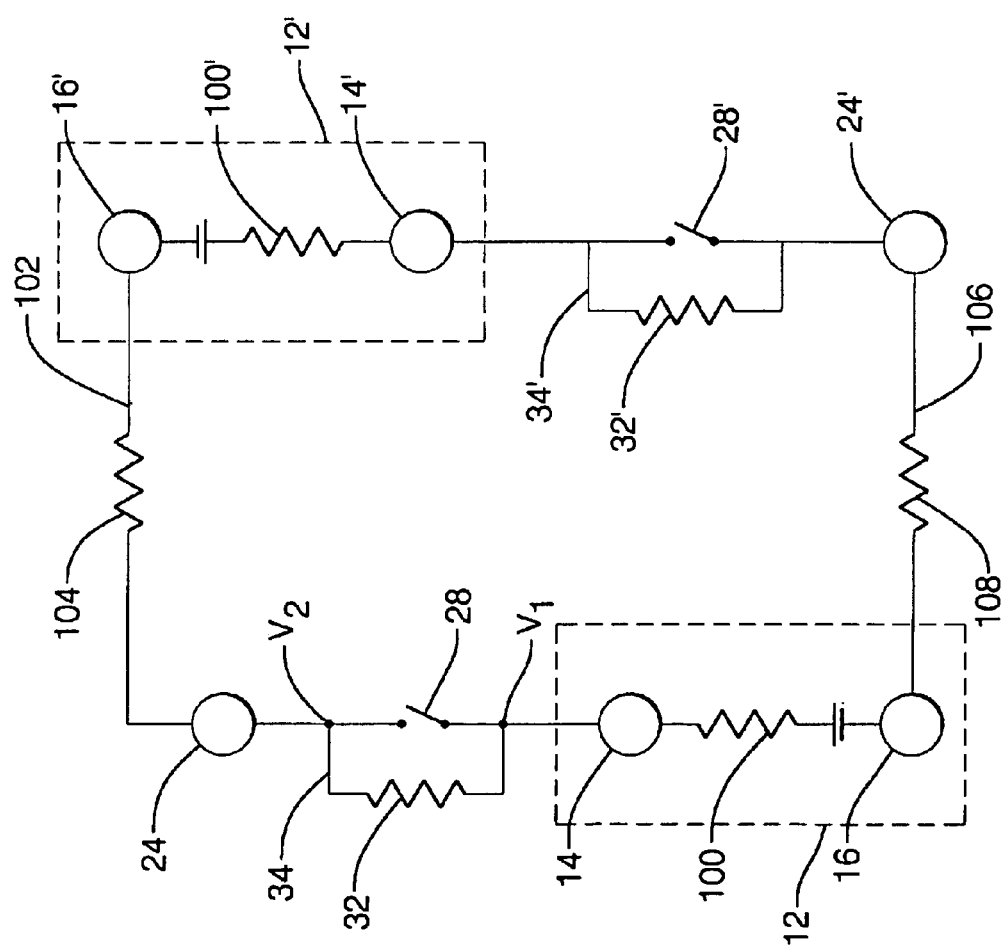
FIG. 3 is a circuit diagram showing use of the present invention in a jump start initiated with reverse polarity connections.

FIG. 3 illustrates one vehicle connected to another vehicle for jump starting with incorrect polarity, each vehicle having the embodiment of the present invention as depicted in FIGS. 1 and 2. FIG. 3 depicts the same items as shown in FIG. 2 except that a first jumper cable 102 having an electrical resistance 104 is shown connecting the positive jump start post 24 on vehicle 1 to the ground battery terminal 16' on vehicle 2. A second jumper cable 106 having an electrical resistance 108 is shown connecting the ground battery terminal 16 on vehicle 1 to the positive jump start post 24' on vehicle 2. FIG. 3 depicts switches 28 and 28' as open. Using the same assumption as described above in FIG. 2, then where the voltage $V_1$ at the positive battery terminal 14 on vehicle 1 equals 10 V and the voltage $V_1'$ at the positive battery terminal 14' on vehicle 2 equals 12 V, then the voltage $V_2$ at the positive jump start post 24 on vehicle 1 would equal approximately –1V and the voltage $V_2'$ at the positive jump start post 24' on vehicle 2 would equal approximately +1V. Each of these voltages being outside of a range that would satisfy a predetermined condition necessary for the switches 28, 28' to close. Further, in the example depicted in FIG. 3, if the resistor 32 is sized at 1000 Ohms, the amount of current flowing through each jumper cable is approximately 0.01 Amp. This is an insufficient amount of current to cause significant electrical arcing. In an unprotected jump start with reverse polarity connections, the amount of current flowing through one or both jumper cables could be several hundred amps for an uncontrolled amount of time. This event can cause significant electrical arcing.

Figure 4:
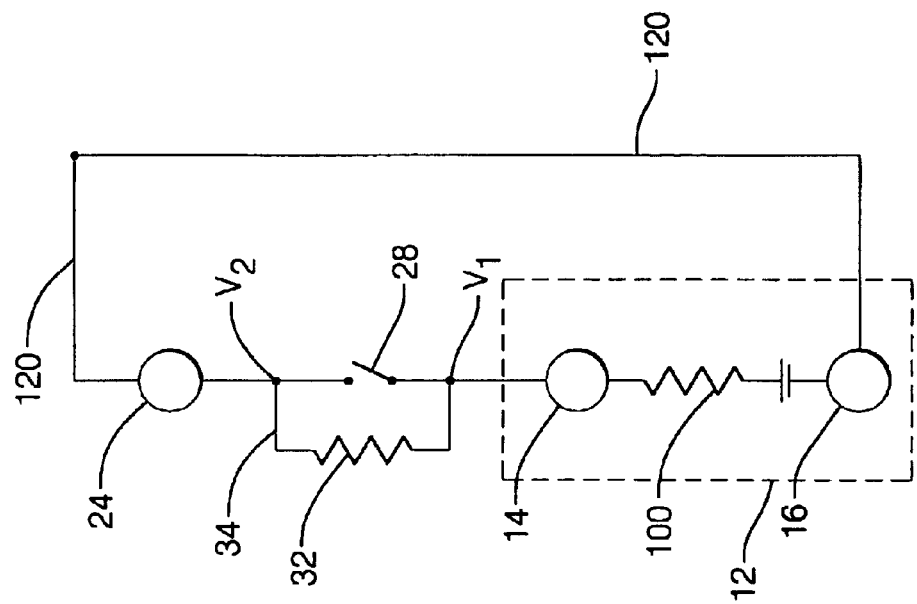
FIG. 4 is a circuit diagram showing use of the present invention in a short circuit to ground condition.

FIG. 4 illustrates one vehicle having the embodiment of the present invention as depicted in FIG. 1 in a situation where a short circuit to ground path 120 exists between the positive jump start post 24 and the ground battery terminal 16. FIG. 4 also depicts the battery 12, the positive battery terminal 14, the ground battery terminal 16, the first (or positive) jump start post 24, the switch 28, the resistor 32, and the second line 34 as depicted in FIG. 1. In this situation, the present invention provides protection because when the short circuit to a ground path 120 exists the voltage $V_2$ at the positive jump start post 24 is close to zero. This value does not satisfy a predetermined condition that causes the microprocessor (not shown) to command the switch 28 to close.

Note further, if the incorrect polarity and/or short circuit condition as depicted in FIGS. 3 and 4 respectively occurs after successfully initiating a jump start as shown in FIG. 2, the resulting voltages at the positive battery terminals 14, 14' and the positive jump start posts 24, 24' satisfy conditions that cause the switches 28, 28' to open. This safely limits duration of any large current flow resulting from the reverse battery connection and/or short circuit to a period of time much less than one second, thereby minimizing the likelihood of damage to the vehicle electrical system and possible injury to the operator.

Note that FIGS. 1–4 depict circuit diagrams comprising the jump start circuit 10 and the battery 12. Physical embodiments of the jump start circuit 10 can be packaged separately from the battery 12. The jump start circuit can also be entirely or partially packaged in the battery 12 or as part of an integral unit with items such as the battery 12, positive jump start post 24, and/or negative jump start post 26.

Figure 5:
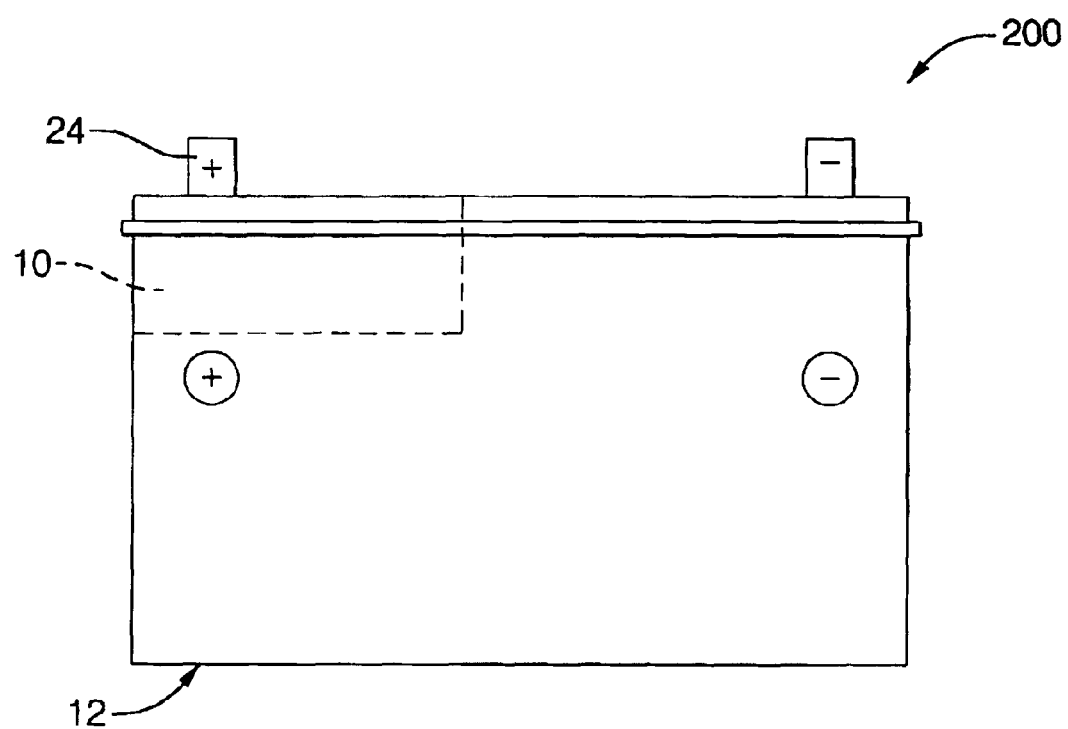
FIG. 5 illustrates a jump start circuit in a DC power supply apparatus.

FIG. 5 illustrates a DC power supply apparatus 200 having a chargeable battery 12 and a jump start circuit 10 electrically connected between the positive end of the battery 12 and the positive jump start post 24.

Other ways to package the jump start circuit 10 may also occur to a person of skill in the art.

This invention has been described with reference to the preferred embodiment and modifications thereto. Further modifications and alterations may occur to others upon reading and understanding the specification. It is intended to include all such modifications and alterations insofar as they come within the scope of the invention. For example, one skilled in the art would realize that where signal generating, sending, or receiving is described herein, the intended purpose can also be accomplished by modifying or terminating an existing signal.

Having thus described the invention, it is claimed:

1. A jump start circuit for electrical connection between a DC power source and a jump start post, said jump start circuit comprising:
   a switch configured to be coupled between said DC power source and said jump start past, said switch having a closed state and an open state;
   a resistive element coupled between said DC power source and said jump start post, said resistive element being positioned in parallel with said switch to enable said DC power source to supply a voltage to said jump start past; and
   a microprocessor being capable of receiving a signal, being capable of measuring voltage at said DC power source and said jump start post, and being further capable of processing the voltage measurement, wherein said microprocessor commanding said switch to close based on a detection of a first predetermined condition, and commanding said switch to open based on a detection of a second predetermined condition, wherein said first predetermined condition comprises a result of processing the voltage measurements falling within an allowable range of values, and wherein said second predetermined condition is selected from a group consisting of:
       a result of processing the voltage measurements falling outside an allowable range of values,
       a voltage at said jump start post exceeding a predefined range for a predefined period of time,
       a signal indicating a movement of a vehicle,
       a signal indicating an automatic transmission selector being placed into reverse or drive gear, and
       a signal indicating a manual transmission being placed into gear.

2. The jump start circuit as claimed in claim 1, wherein said switch is an electromechanical device.

3. The jump start circuit as claimed in claim 1, wherein said microprocessor is a microcontroller.

4. The jump start circuit as claimed in claim 1, wherein said resistive element comprises a resistor.

5. The jump start circuit as claimed in claim 1 wherein said first predetermined condition comprises at least one of the voltage at said DC power source and said voltage at said jump start post being within a predefined range for a predefined period of time.

6. The jump start circuit as claimed in claim 1, wherein mid second predetermined condition comprises at least one of the voltage at said DC power source and the voltage at said jump start post exceeding a threshold value for a predefined period of time.

7. The jump start circuit as claimed in claim 1, wherein said microprocessor being capable of receiving at least one input.

8. The jump start circuit as claimed in claim 7, wherein said second predetermined condition comprises a predetermined signal.

9. The jump start circuit am claimed in claim 7, wherein said second predetermined condition comprises a signal commanding said switch to open.

10. The jump start circuit for electrical connection between a DC power source and a jump start post, said jump start circuit comprising:
   a switch configured to be coupled between said DC power source and said jump start post, said switch having a closed state and an open state;
   a resistive element coupled between said DC power source and said jump start post, said resistive element being positioned in parallel with said switch;
   means to monitor the voltage of said DC power source and said jump start post;
   means to process the voltage measurements;
   means to close said switch based on detection at a first predetermined condition according to the voltage measurements; and
   means to open said switch based on detection of a second predetermined condition, according to the voltage measurements.

11. The jump start circuits claimed in claim 10, wherein said means to open and close said switch comprises a controller.

12. The jump start circuit as claimed in claim 10, wherein said first predetermined condition comprises at least one of said voltage at said DC power source and said voltage at said jump start post being within a predefined range for a predefined period of time.

13. The jump start circuit as claimed in claim 10, wherein said second predetermined condition comprises at least one of said voltage at said DC power source and said voltage at said jump start post exceeding a threshold value for a predefined period of time.

14. The jump start circuit as claimed in claim 10, wherein said jump start circuit having means to receive at least one input.

15. A DC power supply comprising:
   a chargeable battery having positive and negative ends; and
   a jump start circuit electrically connected between said positive end of said battery and a jump start post, said jump start circuit comprising:
      a switch configured to be coupled between said DC power source and said jump start post, said switch having a closed state and an open state;
      a resistive element coupled between said DC power source and said jump start post, said resistive element being positioned in parallel with said switch; and
      a microprocessor measuring voltages at said DC power source and said jump start post and processing the voltage measurements, wherein said microprocessor commanding said switch to close based on detection of a first predetermined condition, and commanding said switch to open based on detection of a second predetermined condition.

16. A jump start circuit for electrical connection between a DC power source and a jump start post, said jump start circuit comprising:
   a switch electrically connected between said DC power source and said jump start post, said switch having a closed position and an open position, said switch being biased to said normally open position;
   a resistive element electrically connected between said DC power source and said jump start post, said resistive element being connected in parallel with said switch enabling said DC power source to provide voltage to said jump start post; and
   a microprocessor configured to measure voltage at said DC power source and said jump start post, configured to process a first set of voltage measurements obtained from said DC power source and said jump start post, configured to command said switch to close based on detection of a first predetermined condition, configured to process a second set of voltage measurements obtained from said DC power source and said jump start post, and configured to command said switch to open based on detection of a second predetermined condition, wherein said first predetermined condition comprises a determination that a result obtained from processing said first set of voltage measurements satisfies predefined criteria.

17. The jump start circuit as claimed in claim 16, wherein said second predetermined condition comprises a determination that a result obtained from processing said second set of voltage measurements satisfies predefined criteria.

18. The jump start circuit as claimed in claim 16, wherein said microprocessor being further capable of receiving at least one input and said second predetermined condition comprises detection of a signal commanding said switch to open.

* * * * *